US008642149B2

(12) United States Patent
Yamakawa et al.

(10) Patent No.: US 8,642,149 B2
(45) Date of Patent: Feb. 4, 2014

(54) HOSE FOR TRANSPORTING REFRIGERANT (75) Inventors: Kazuto Yamakawa, Kanagawa-ken (JP);
Yuusuke Matsuya, Kanagawa-ken (JP);
Koji Sato, Kanagawa-ken (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 13/643,993

(22) PCT Filed: Apr. 27, 2010

(86) PCT No.: PCT/JP2010/057448
§ 371 (c)(1),
(2), (4) Date: Oct. 26, 2012

(87) PCT Pub. No.: WO2011/135668
PCT Pub. Date: Nov. 3, 2011

(65) Prior Publication Data
US 2013/0056106 A1   Mar. 7, 2013

(51) Int. Cl.
*B32B 1/08* (2006.01)
*B32B 23/00* (2006.01)

(52) U.S. Cl.
USPC ..... 428/36.91; 428/34.1; 428/34.2; 428/35.7; 428/35.9; 428/36.9

(58) Field of Classification Search
USPC .......... 428/34.1, 34.2, 35.7, 36.9, 35.9, 36.91
See application file for complete search history.

(56) References Cited

U.S. PATENT DOCUMENTS

| | | | | |
|---|---|---|---|---|
| 5,488,974 | A | * | 2/1996 | Shiota et al. ............... 138/125 |
| 2008/0230137 | A1 | | 9/2008 | Sakazaki et al. |
| 2011/0186170 | A1 | | 8/2011 | Oishi et al. |

FOREIGN PATENT DOCUMENTS

| | | | |
|---|---|---|---|
| EP | 1568484 | | 2/2005 |
| JP | 58-013643 | | 1/1983 |
| JP | 58013643 | A * | 1/1983 |
| JP | 03-268942 | | 11/1991 |
| JP | 05-052280 | | 3/1993 |
| JP | 2000-220770 | | 8/2000 |
| JP | 2005-240853 | | 9/2005 |
| JP | 2008-265283 | | 11/2008 |
| JP | 4365454 | | 11/2009 |

OTHER PUBLICATIONS

International Search Report dated Jul. 20, 2010.
Notification of Transmittal of Translation of the International Preliminary Search Report on Patentability, Dec. 20, 2012, 7 pages.

* cited by examiner

*Primary Examiner* — Marc Patterson
(74) *Attorney, Agent, or Firm* — Thorpe North & Western LLP (57) ABSTRACT A hose for transporting refrigerant of the present technology includes an inner tube layer having a gas barrier layer and a rubber layer adjacent to an outer surface of the gas barrier layer. The gas barrier layer includes a polyamide resin composition obtained by blending from 0.5 to 20 parts by mass of a hydrotalcite per 100 parts by mass of a modified polyamide obtained by blending a polyamide and a carboxyl group-containing modified polyolefin. The rubber layer includes a rubber composition obtained by compounding from 1 to 15 parts by mass of an alkylphenol-formaldehyde resin per 100 parts by mass of a raw rubber. The raw rubber is at least one selected from the group consisting of a BIMS and a butyl rubber and/or a halogenated butyl rubber, which is a copolymer rubber.

15 Claims, 10 Drawing Sheets

FIG. 1

| Rubber composition formulation | | Comparative Example 1-1 | Comparative Example 1-2 | Comparative Example 2 | Comparative Example 3 | Comparative Example 4 |
|---|---|---|---|---|---|---|
| IIR | Parts by mass | 100 | 100 | | | |
| Cl-IIR | Parts by mass | | | | | |
| Br-IIR | Parts by mass | | | 100 | | 32 |
| BIMS | Parts by mass | | | | 100 | 13 |
| EPDM | Parts by mass | | | | | 55 |
| C.B. (ISAF) | Parts by mass | | | 50 | 50 | 50 |
| C.B. (HAF) | Parts by mass | 80 | 80 | | | |
| St. acid | Parts by mass | 3 | 3 | 2 | 2 | 2 |
| Paraffin oil | Parts by mass | 10 | 10 | 5 | 5 | 5 |
| Zinc stearate | Parts by mass | 2 | 2 | 2 | 2 | 2 |
| Brominated alkylphenol-formaldehyde resin | Parts by mass | 8 | 8 | 3 | 3 | 3 |

FIG. 2a

|  |  | Comparative Example 1-1 | Comparative Example 1-2 | Comparative Example 2 | Comparative Example 3 | Comparative Example 4 |
|---|---|---|---|---|---|---|
| Rubber Composition Extrusion Processability | | | | | | |
| Minimum Mooney viscosity | N·m | 57.8 | 57.8 | 69.6 | 68.4 | 51 |
| Extrusion processability | | ○ | ○ | ○ | ○ | ○ |
| Rubber Composition Physical Properties | | | | | | |
| TB | MPa | 9.2 | 9.2 | 13.2 | 11.4 | 17.2 |
| EB | % | 635 | 635 | 565 | 120 | 380 |
| M100 | MPa | 2 | 2 | 2.5 | 10 | 4.5 |
| Hs | | 70 | 70 | 73 | 83 | 77 |
| Polyamide resin compositions 1 to 8 (type of gas barrier layer) | | Polyamide resin composition 1 | Polyamide resin composition 1 | Polyamide resin composition 1 | Polyamide resin composition 1 | Polyamide resin composition 1 |
| Modified polyamide | Parts by mass | 100 | 100 | 100 | 100 | 100 |
| Hydrotalcite | Parts by mass | | | | | |
| MgO | Parts by mass | | | | | |
| Young's Modulus of the Polyamide Resin Composition | MPa | 230 | 230 | 230 | 230 | 230 |
| Young's modulus evaluation (○: 300 MPa or less) | | ○ | ○ | ○ | ○ | ○ |

FIG. 2b

| | Comparative Example 1-1 | Comparative Example 1-2 | Comparative Example 2 | Comparative Example 3 | Comparative Example 4 |
|---|---|---|---|---|---|
| Adhesive strength of the rubber composition/polyamide resin composition | | | | | |
| Adhesive strength N/25 mm | 79 | 35 | 43 | 29 | 84 |
| Adhesive strength evaluation (≥ 40 N/25 mm) | ○ | × | ○ | × | ○ |
| Rubber sticking Area proportion (%) | 90 | 0 | 100 | 100 | 100 |
| Thickness | (Thin) | (Interface) | (Thin) | (Thick) | (Somewhat thick) |
| Rubber sticking evaluation | × | × | × | ○ | ◇ |
| Delamination | × | × | × | × | ○ |

FIG. 2c

| | | Working Example 1 | Working Example 2 | Working Example 3 | Comparative Example 5 | Working Example 4 | Working Example 5 |
|---|---|---|---|---|---|---|---|
| Rubber composition formulation | | | | | | | |
| IIR | Parts by mass | 100 | | | | | |
| Cl-IIR | Parts by mass | | | | | | |
| Br-IIR | Parts by mass | | 100 | | 32 | 32 | 32 |
| BIMS | Parts by mass | | | 100 | 13 | 13 | 13 |
| EPDM | Parts by mass | | | | 55 | 55 | 55 |
| C.B. (ISAF) | Parts by mass | | 50 | 50 | 50 | 50 | 50 |
| C.B. (HAF) | Parts by mass | 80 | | | | | |
| St. acid | Parts by mass | 3 | 2 | 2 | 2 | 2 | 2 |
| Paraffin oil | Parts by mass | 10 | 5 | 5 | 5 | 5 | 5 |
| Zinc stearate | Parts by mass | 2 | 2 | 2 | 2 | 2 | 2 |
| Brominated alkylphenol-formaldehyde resin | Parts by mass | 8 | 3 | 3 | 3 | 3 | 3 |

FIG. 3a

| | | Working Example 1 | Working Example 2 | Working Example 3 | Comparative Example 5 | Working Example 4 | Working Example 5 |
|---|---|---|---|---|---|---|---|
| Rubber Composition Extrusion Processability | | | | | | | |
| Minimum Mooney viscosity | N·m | 57.8 | 69.6 | 68.4 | 51 | 51 | 51 |
| Extrusion processability | | ○ | ○ | ○ | ○ | ○ | ○ |
| Rubber Composition Physical Properties | | | | | | | |
| TB | MPa | 9.2 | 13.2 | 11.4 | 17.2 | 17.2 | 17.2 |
| EB | % | 635 | 565 | 120 | 380 | 380 | 380 |
| M100 | MPa | 2 | 2.5 | 10 | 4.5 | 4.5 | 4.5 |
| Hs | | 70 | 73 | 83 | 77 | 77 | 77 |
| Polyamide resin compositions 1 to 8 (type of gas barrier layer) | | Polyamide resin composition 2 | Polyamide resin composition 2 | Polyamide resin composition 2 | Polyamide resin composition 3 | Polyamide resin composition 4 | Polyamide resin composition 2 |
| Modified polyamide | Parts by mass | 100 | 100 | 100 | 100 | 100 | 100 |
| Hydrotalcite | Parts by mass | 3 | 3 | 3 | 0.3 | 0.5 | 3 |
| MgO | Parts by mass | | | | | | |
| Young's Modulus of the Polyamide Resin Composition | MPa | 245 | 245 | 245 | 230 | 230 | 245 |
| Young's modulus evaluation (○: 300 MPa or less) | | ○ | ○ | ○ | ○ | ○ | ○ |

FIG. 3b

| | Working Example 1 | Working Example 2 | Working Example 3 | Comparative Example 5 | Working Example 4 | Working Example 5 |
|---|---|---|---|---|---|---|
| Adhesive strength of the rubber composition/polyamide resin composition | | | | | | |
| Adhesive strength N/25 mm | 46 | 52 | 40 | 85 | 85 | 95 |
| Adhesive strength evaluation (≥ 40 N/25) | ○ | ○ | ○ | ○ | ○ | ○ |
| Rubber sticking Area proportion (%) | 100 | 100 | 100 | 100 | 100 | 100 |
| Thickness | (Thick) | (Thick) | (Thick) | (Somewhat thick) | (Thick) | (Thick) |
| Rubber sticking evaluation | ○ | ○ | ○ | ◇ | ○ | ○ |
| Delamination | ○ | ○ | ○ | ○ | ○ | ○ |

FIG. 3c

| Rubber composition formulating | | Working Example 6 | Working Example 7 | Comparative Example 6 | Working Example 8 | Working Example 9 | Comparative Example 7 | Working Example 10 |
|---|---|---|---|---|---|---|---|---|
| IIR | Parts by mass | | | | | | | |
| Cl-IIR | Parts by mass | | | | 32 | | | |
| Br-IIR | Parts by mass | 32 | 32 | 32 | | 32 | 32 | 32 |
| BIMS | Parts by mass | 13 | 13 | 13 | 13 | 13 | 13 | 13 |
| EPDM | Parts by mass | 55 | 55 | 55 | 55 | 55 | 55 | 55 |
| C.B. (ISAF) | Parts by mass | 50 | 50 | 50 | 50 | 50 | 50 | 85 |
| C.B. (HAF) | Parts by mass | | | | | | | |
| St. acid | Parts by mass | 2 | 2 | 2 | 2 | 2 | 2 | 2 |
| Paraffin oil | Parts by mass | 5 | 5 | 5 | 5 | 5 | 5 | 5 |
| Zinc stearate | Parts by mass | 2 | 2 | 2 | 2 | 2 | 2 | 2 |
| Brominated alkylphenol-formaldehyde resin | Parts by mass | 3 | 3 | 3 | 3 | 3 | 3 | 3 |

FIG. 4a

|  |  | Working Example 6 | Working Example 7 | Comparative Example 6 | Working Example 8 | Working Example 9 | Comparative Example 7 | Working Example 10 |
|---|---|---|---|---|---|---|---|---|
| Rubber Composition Extrusion Processability |  |  |  |  |  |  |  |  |
| Minimum Mooney viscosity | N·m | 51 | 51 | 51 | 50.7 | 52.4 | 51 | 95.1 |
| Extrusion processability |  | ○ | ○ | ○ | ○ | ○ | ○ | × |
| Rubber Composition Physical Properties |  |  |  |  |  |  |  |  |
| TB | MPa | 17.2 | 17.2 | 17.2 | 17.4 | 16.2 | 17.2 | 15.9 |
| EB | % | 380 | 380 | 380 | 350 | 400 | 380 | 215 |
| M100 | MPa | 4.5 | 4.5 | 4.5 | 4.6 | 4.1 | 4.5 | 9.8 |
| Hs |  | 77 | 77 | 77 | 77 | 76 | 77 | 95 |
| Polyamide resin compositions 1 to 8 (type of gas barrier layer) |  | Polyamide resin composition 5 | Polyamide resin composition 6 | Polyamide resin composition 7 | Polyamide resin composition 2 | Polyamide resin composition 2 | Polyamide resin composition 8 | Polyamide resin composition 2 |
| Modified polyamide | Parts by mass | 100 | 100 | 100 | 100 | 100 | 100 | 100 |
| Hydrotalcite | Parts by mass | 10 | 20 | 23 | 3 | 3 |  | 3 |
| MgO | Parts by mass |  |  |  |  |  | 3 |  |
| Young's Modulus of the | MPa | 267 | 290 | 305 | 245 | 245 | 250 | 245 |
| Young's modulus evaluation (○: 300 MPa or less) |  | ○ | ○ | × | ○ | ○ | ○ | ○ |

FIG. 4b

| | Working Example 6 | Working Example 7 | Comparative Example 6 | Working Example 8 | Working Example 9 | Comparative Example 7 | Working Example 10 |
|---|---|---|---|---|---|---|---|
| Adhesive strength of the rubber composition/polyamide resin composition | | | | | | | |
| Adhesive strength N/25 mm | 100 | 106 | 105 | 82 | 75 | 3 | 94 |
| Adhesive strength evaluation (≥ 40) | ○ | ○ | ○ | ○ | ○ | × | ○ |
| Rubber sticking — Area proportion | 100 | 100 | 100 | 100 | 100 | 0 | 100 |
| Rubber sticking — Thickness | (Thick) | (Thick) | (Thick) | (Thick) | (Thick) | (Interface) | (Thick) |
| Rubber sticking evaluation | ○ | ○ | ○ | ○ | ○ | × | ○ |
| Delamination | ○ | ○ | ○ | ○ | ○ | × | ○ |

HOSE FOR TRANSPORTING REFRIGERANT

TECHNICAL FIELD

The present technology relates to a hose for transporting refrigerant.

BACKGROUND ART

In recent years, laminates of a resin obtained by combining a resin material such as a polyamide or the like having low gas permeability and a rubber material have been conventionally used as hoses for transporting refrigerant used in car air conditioning systems and the like.

To date, the present applicant has proposed a hose in which a resin and a rubber are bonded without using an adhesive or the like (Japanese Patent No. 4365454).

Additionally, Japanese Unexamined Patent Application Publication No. 2000-220770A describes a hose in which an innermost layer and an intermediate rubber layer are bonded without using a conventional adhesive.

SUMMARY

However, as a result of diligent research, the present inventors found that there is still room to enhance adhesion when directly bonding a resin layer and a rubber layer.

Therefore, the present technology provides a hose having superior adhesion between a gas barrier layer and a rubber layer.

A hose for transporting refrigerant includes an inner tube layer having a gas barrier layer and a rubber layer adjacent to an outer surface of the gas barrier layer, wherein the gas barrier layer includes a polyamide resin composition obtained by blending from 0.5 to 20 parts by mass of a hydrotalcite per 100 parts by mass of a modified polyamide obtained by blending a polyamide and a carboxyl group-containing modified polyolefin;

the rubber layer includes a rubber composition obtained by compounding from 1 to 15 parts by mass of an alkylphenol-formaldehyde resin per 100 parts by mass of a raw rubber; and the raw rubber includes at least one selected from the group consisting of a BIMS and a butyl rubber and/or a halogenated butyl rubber, which is a copolymer rubber.

Specifically, the present technology provides the following 1 to 9.

1. A hose for transporting refrigerant including an inner tube layer having a gas barrier layer and a rubber layer adjacent to an outer surface of the gas barrier layer, wherein the gas barrier layer includes a polyamide resin composition obtained by blending from 0.5 to 20 parts by mass of a hydrotalcite per 100 parts by mass of a modified polyamide obtained by blending a polyamide and a carboxyl group-containing modified polyolefin;

the rubber layer includes a rubber composition obtained by compounding from 1 to 15 parts by mass of an alkylphenol-formaldehyde resin per 100 parts by mass of a raw rubber; and the raw rubber is at least one selected from the group consisting of a BIMS and a butyl rubber and/or a halogenated butyl rubber, which is a copolymer rubber.

2. The hose for transporting refrigerant described in 1, wherein the rubber composition further includes from 30 to 80 parts by mass of a carbon black per 100 parts by mass of the raw rubber;

the raw rubber includes a BIMS, a butyl rubber and/or a halogenated butyl rubber, which is a copolymer rubber and, also, an EPDM;

a content of the BIMS in the raw rubber is from 5 to 40 parts by mass, a total of contents of the BIMS and the copolymer rubber is from 20 to 80 parts by mass, and a content of the EPDM is from 80 to 20 parts by mass; and the carbon black has an $N_2SA$ that is greater than or equal to 75 $m^2/g$ and a DBP oil absorption that is greater than or equal to 90 $cm^3/100$ g.

3. The hose for transporting refrigerant described in 1 or 2, wherein the copolymer rubber is a halogenated butyl rubber.

4. The hose for transporting refrigerant described in any of 1 to 3, wherein the polyamide is at least one selected from the group consisting of polyamide 6, polyamide 11, polyamide 12, polyamide 4-6, polyamide 6-6, polyamide 6-10, polyamide 6-12, polyamide MXD-6, and copolymers of two or more of these.

5. The hose for transporting refrigerant described in any of 1 to 4, wherein the hydrotalcite is not surface treated.

6. The hose for transporting refrigerant described in any of 1 to 5, wherein the hydrotalcite is produced by calcining raw hydrotalcite.

7. The hose for transporting refrigerant described in any of 1 to 6, wherein an adhesive layer is not interposed between the gas barrier layer and the rubber layer.

8. The hose for transporting refrigerant described in any of 1 to 7, wherein the gas barrier layer and the rubber layer are directly bonded.

9. The hose for transporting refrigerant described in any of 1 to 8, wherein a reinforcing layer is provided on the inner tube layer and an outer tube layer is provided on the reinforcing layer.

Adhesion between the gas barrier layer and the rubber layer of the hose for transporting refrigerant of the present technology is superior.

BRIEF DESCRIPTION OF THE DRAWINGS

FIGS. 2a-4c include comparative and working examples of Table 1.

DETAILED DESCRIPTION

The present technology is explained in detail below.

A hose for transporting refrigerant of the present technology is a hose including an inner tube layer having a gas barrier layer and a rubber layer adjacent to an outer surface of the gas barrier layer. The gas barrier layer includes a polyamide resin composition obtained by blending from 0.5 to 20 parts by mass of a hydrotalcite per 100 parts by mass of a modified polyamide obtained by blending a polyamide and a carboxyl group-containing modified polyolefin. The rubber layer includes a rubber composition obtained by compounding from 1 to 15 parts by mass of an alkylphenol-formaldehyde resin per 100 parts by mass of a raw rubber. The raw rubber is at least one selected from the group consisting of a BIMS and a butyl rubber and/or a halogenated butyl rubber, which is a copolymer rubber.

Hereinafter, the hose for transporting refrigerant of the present technology is also referred to as the "hose of the present technology".

The hose of the present technology is a hose for transporting refrigerant including an inner tube layer having a gas barrier layer and a rubber layer adjacent to an outer surface of the gas barrier layer. A layer formed from an adhesive is not interposed between the gas barrier layer and the rubber layer.

The hose of the present technology includes cases in which the hose of the present technology is formed only from the inner tube layer and does not include other layers. Configurations of the hose of the present technology are described in detail hereinafter, but may also be the same as conventional hoses.

Gas Barrier Layer

A description of the gas barrier layer is given below.

The gas barrier layer of the hose of the present technology is formed using a polyamide resin composition obtained by blending from 0.5 to 20 parts by mass of a hydrotalcite per 100 parts by mass of a modified polyamide obtained by blending a polyamide and a carboxyl group-containing modified polyolefin.

The hydrotalcite is a powerful halogen catcher. Therefore, the hydrotalcite can proactively extract halogens (e.g. chlorine atoms and bromine atoms) from the halides (e.g. halogenated butyl rubber, BIMS, and halogenated alkylphenol-formaldehyde resin) included in the rubber layer (rubber composition) that is adjacent the gas barrier layer. As a result, an amount of reacting between carboxyl groups included in the carboxyl group-containing modified polyolefin in the gas barrier layer (polyamide resin composition) and the rubber layer (rubber composition) becomes greater than that in a case where a hydrotalcite is not included at an interface between the gas barrier layer and the rubber layer.

For this reason it is thought that crosslinking density between the gas barrier layer and the rubber layer increases and adhesion between the gas barrier layer and the rubber layer is superior.

Additionally, it is thought that in cases where the alkylphenol-formaldehyde resin included in the rubber composition as a crosslinking agent is halogenated, the hydrotalcite extracts halogens from the halogenated alkylphenol-formaldehyde resin. Therefore, reaction between the raw rubber and the crosslinking agent progresses, crosslinking density of the rubber itself in the vicinity of the interface with the gas barrier layer increases, and the rubber layer becomes stronger. Moreover, it is thought that because the crosslinking density between the gas barrier layer and the rubber layer increases as described above, the adhesion between the gas barrier layer and the rubber layer becomes superior.

The polyamide is not particularly limited. Particularly, the polyamide is preferably at least one selected from the group consisting of polyamide 6, polyamide 11, polyamide 12, polyamide 4-6, polyamide 6-6, polyamide 6-10, polyamide 6-12, polyamide MXD-6, and copolymers of two or more of these.

Examples of a preferable carboxyl group-containing modified polyolefin includes a modified polyolefin wherein from about 0.1 to 10 mol % of a functional group is introduced via graft polymerization of an acid anhydride such as maleic anhydride to a polyolefin which is a homopolymerized or copolymerized olefin or diene monomer such as ethylene, propylene, butadiene, and the like.

From the perspective of obtaining superior adhesion between the gas barrier layer and the rubber layer, a blend ratio (mass ratio) of the polyamide to the carboxyl group-containing modified polyolefin is preferably from 90/10 to 50/50 and more preferably from 85/15 to 65/35. While flexibility of the hose of the present technology improves when a proportion of the carboxyl group-containing modified polyolefin is great, there is a risk that refrigerant permeation resistance will decline. Likewise while refrigerant permeation resistance improves when the proportion is small, adhesion with the rubber layer and flexibility will tend to be inferior.

The modified polyamide is not particularly limited so long as it is obtained by blending the polyamide and the carboxyl group-containing modified polyolefin. The modified polyamide can be an alloy of the polyamide and the carboxyl group-containing modified polyolefin.

Examples of the modified polyamide include Zytel ST series products such as Zytel ST801, Zytel ST811, and Zytel ST811HS (manufactured by DuPont), which are thought to be produced by alloying polyamide 6 and a maleic anhydride-modified polyolefin.

A description of the hydrotalcite is given below.

The hydrotalcite included in the polyamide resin composition is not particularly limited. The hydrotalcite may be a natural or a synthetic hydrotalcite. Specific examples thereof include:

$Mg_3ZnAl_2(OH)_{12}CO_3 \cdot wH_2O$ (where w is a real number);

$Mg_xAl_y(OH)_{2x+3y-2}CO_3 \cdot wH_2O$ (where x is from 1 to 10, y is from 1 to 10, and w is a positive real number);

$Mg_xAl_y(OH)_{2x+3y-2}CO_3$ [however x is from 1 to 10 and y is from 1 to 10; a specific example thereof being $Mg_{4.3}Al_2(OH)_{12.6}CO_3$; DHT-4A-2 (trade name); manufactured by Kyowa Chemical Industry Co., Ltd.]; and $Mg_{1-x}Al_xO_{3.83x}$ (where $0.2 \leq x < 0.5$; a specific example thereof being $Mg_{0.7}Al_{0.3}O_{1.15}$; KW-2200 (trade name); manufactured by Kyowa Chemical Industrial Co., Ltd.).

Among these hydrotalcites, from the perspectives of obtaining superior adhesion between the gas barrier layer and the rubber layer and high halogen catching capacity, hydrotalcites that have low OH contents such as $Mg_{1-x}Al_xO_{3.83x}$ are preferable, and $Mg_{0.7}Al_{0.3}O_{1.15}$ is more preferable. The hydrotalcite having a low OH content in the chemical structure can be produced by calcining (at an elevated temperature) a raw hydrotalcite (e.g. a hydrotalcite obtained via synthesis).

A commercially available product can be used as the hydrotalcite. Examples of commercially available hydrotalcites include the DHT series (DHT-4A-2, DHT-4C) manufactured by Kyowa Chemical Industry Co., Ltd., the KW series (grade baked at a higher temperature than the DHT series that tends to have a higher halogen trapping capacity than the DHT series; KW-2000, KW-2100, and KW-2200) also manufactured by Kyowa Chemical Industrial Co., Ltd., and the STABIACE HT series manufactured by Sakai Chemical Industry Co., Ltd.

When the hydrotalcite is a synthetic hydrotalcite, a manufacturing method thereof may be a conventional method.

From the perspective of obtaining high halogen catching capacity of the hydrotalcite and superior adhesion between the gas barrier layer and the rubber layer, the hydrotalcite can be a hydrotalcite that has not been surface treated using a surface treating agent such as a fatty acid (including higher fatty acids), a fatty ester, or the like. In other words, the hydrotalcite can be a hydrotalcite with an untreated surface.

A single hydrotalcite can be used or a combination of two or more hydrotalcites can be used.

In the present technology, an amount of the hydrotalcite is from 0.5 to 20 parts by mass per 100 parts by mass of the modified polyamide. When within such a range, superior adhesion between the gas barrier layer and the rubber layer, superior flexibility (flexibility of the gas barrier layer and the hose body, low flexural rigidity of the hose itself, and good manageability in an engine room), and superior vibration non-transmission (vibration from a compressor used to compress the refrigerant does not easily transmit to a vehicle body side and effects of vibration and noise experienced in the vehicle are minimal) are obtained.

Additionally, from the perspectives of obtaining superior adhesion between the gas barrier layer and the rubber layer, superior flexibility, superior vibration non-transmission, and an excellent balance between the adhesion, flexibility, and vibration non-transmission, an amount of the hydrotalcite is preferably from 2 to 15 parts by mass, and more preferably from 3 to 15 parts by mass per 100 parts by mass of the modified polyamide.

The polyamide resin composition can include additives as desired, as long as the object of the present technology is not hindered. Examples of the additives include fillers, reinforcing agents, antiaging agents, plasticizers, pigments (dyes), tackifiers, lubricants, dispersing agents, and processing aids.

A manufacturing method of the polyamide resin composition is not particularly limited. Examples thereof include a method wherein the modified polyamide and the hydrotalcite, and, as required, the additives, are mixed using a twin screw kneader extruder.

From the perspective of achieving superior mixing processability, a mixing temperature is preferably from 180° C. to 300° C. and more preferably from 200° C. to 280° C.

A Young's modulus of a cured product (e.g. a sheet) formed from the polyamide resin composition is preferably 300 MPa or less and more preferably 270 MPa or less.

When the Young's modulus of the cured product is 300 MPa or less, flexibility and vibration non-transmission will be superior. If the Young's modulus of the cured product exceeds 300 MPa, the flexural rigidity of the hose itself will increase, manageability in an engine room will decline, vibration from a compressor used to compress the refrigerant will transmit to a vehicle body side, and problems related to vibration and noise will easily occur.

In the present technology, the Young's modulus of the cured product can be configured to be 300 MPa or less by setting the amount of the hydrotalcite to be from 0.5 to 20 parts by mass per 100 parts by mass of the modified polyamide.

In the present technology, the Young's modulus is measured in accordance with Japan Industry Standard (JIS) K 7161 as follows. A sheet is fabricated using the polyamide resin composition at a temperature of 230° C. A sample is cut from the sheet having the following dimensions: 5 mm (width)×80 mm (length)×0.15 mm (thickness) and this was used as a sample (the sample described in the Working Examples). A pulling speed at which the Young's modulus was measured is 50 mm/minute.

The gas barrier layer can be formed by extrusion molding the polyamide resin composition into, for example, a tube shape.

A thickness of the gas barrier layer is not particularly limited but is preferably from 0.01 to 0.50 mm, more preferably from 0.05 to 0.30 mm, and even more preferably from 0.05 to 0.20 mm. When the thickness is within this range, moldability, refrigerant permeation resistance, and flexibility tend to be better.

Rubber Layer

A description of the rubber layer is given below.

The rubber layer includes a rubber composition obtained by compounding from 1 to 15 parts by mass of an alkylphenol-formaldehyde resin per 100 parts by mass of a raw rubber. The raw rubber includes at least one selected from the group consisting of a BIMS and a butyl rubber and/or a halogenated butyl rubber, which is a copolymer rubber.

First, a description of the raw rubber will be given.

The raw rubber includes at least one selected from the group consisting of a BIMS and a butyl rubber and/or a halogenated butyl rubber, which is a copolymer rubber. The raw rubber can be made crosslinkable by using a phenol-based resin.

Next, a description of the BIMS that the raw rubber can include will be given.

The BIMS is a bromide of a copolymer of p-alkylstyrene and isomonoolefin. Examples of the BIMS include a bromide of a copolymer of p-alkylstyrene and an isomonoolefin having from 4 to 7 carbons, wherein a content of the p-alkylstyrene (PAS) is from 5 to 25 mass %, a content of bromine (Br) is not less than 1.5 mass %, and a mass ratio of the p-alkylstyrene unit to the bromine unit is such that $0.15 \leq Br/PAS \leq 0.40$. Specific examples thereof include brominated isobutylene-p-methylstyrene copolymer rubber. A Mooney viscosity (ML1+8, 125° C.) of the BIMS is not less than 30.

Examples of the isomonoolefin having from 4 to 7 carbons include isobutylene. Examples of the p-alkylstyrene include styrenes having from 1 to 5 carbons and an alkyl group at the para position such as p-methylstyrene, p-ethylstyrene, and the like. Including the bromide of the alkyl group of the p-alkylstyrene and all components having a p-alkylstyrene backbone, a content of the p-alkylstyrene in the BIMS is from 5 to 25 mass %, and preferably from 5 to 10 mass %. Refrigerant permeation resistance and the like will be superior if the content is 5 mass % or greater. Additionally, the rubber composition will not become brittle and low temperature resistance will be superior if the content is 25 mass % or less.

The BIMS is a commercially available product, and examples thereof include the EXXPRO series, manufactured by ExxonMobil Chemical Company. Specific examples include Exxpro 3745, manufactured by the same, which is a bromide of a copolymer rubber of isobutylene and p-methylstyrene.

Next, a description of the copolymer rubber that the raw rubber can include will be given.

The copolymer rubber is a butyl rubber and/or a halogenated butyl rubber, and is preferably a halogenated butyl rubber, because the adhesion of the obtained hose of the present technology will be superior and durability will be enhanced.

The butyl rubber is not particularly limited and conventional isobutylene.isoprene rubber can be used, however a content of the isoprene as a degree of unsaturation is preferably from 0.6 to 2.5 mol %, and a molecular weight as a Mooney viscosity is preferably from 35 to 60 (at 125° C.)

Examples of the halogenated butyl rubber include chlorinated butyl rubber, brominated butyl rubber, and the like. Conventional halogenated butyl rubbers can be used as well, and when a chlorinated butyl rubber is used, a chlorine content is preferably from 1 to 2.5 mass %, the content of the isoprene as a degree of unsaturation is preferably from 0.6 to 2.5 mol %, and the molecular weight as the Mooney viscosity is preferably from 30 to 60 (at 125° C.). When a brominated butyl rubber is used, a bromine content is preferably from 1 to 2.5 mass %, the content of the isoprene as a degree of unsaturation is preferably from 0.6 to 2.5 mol %, and the molecular weight as the Mooney viscosity is preferably from 25 to 55 (at 125° C.)

The raw rubber can further include an ethylene propylene diene monomer (EPDM).

The EPDM that can be further included in the raw rubber is not particularly limited so long as it is a conventional copolymer rubber obtained by polymerizing ethylene, propylene, and a diene. Examples of commercially available products include Mitsui EPT-4070, manufactured by Mitsui Chemicals, Inc. A propylene content is preferably from 10 to 70 mol %, and more preferably from 15 to 50 mol %. Examples of the diene component include ethylidene norbornane, dicyclopentadiene, and 1,4-hexadiene. Among these, ethylidene norbornane, which as a high rate of crosslinking, is preferable. An amount of the diene component as an iodine value is preferably from 3 to 25, and more preferably from 5 to 20.

The raw rubber preferably includes the BIMS and the butyl rubber and/or halogenated butyl rubber, which is a copolymer rubber, and the EPDM.

From the perspective of obtaining superior adhesion between the gas barrier layer and the rubber layer, a content of the BIMS in the raw rubber is preferably from 5 to 40 parts by mass.

From the perspective of obtaining superior adhesion between the gas barrier layer and the rubber layer, a content of the BIMS and the butyl rubber and/or halogenated butyl rubber, which is a copolymer rubber, in the raw rubber is preferably from 20 to 80 parts by mass.

From the perspective of obtaining superior adhesion between the gas barrier layer and the rubber layer, a content of the EPDM in the raw rubber is preferably from 80 to 20 parts by mass.

If the content of the BIMS is less than 5 parts by mass, it will be difficult to obtain the necessary rubber sticking. In other words, it will be difficult to form an adhesive rubber layer having the necessary thickness on the surface of the gas barrier layer (rubber sticking is evaluated hereinafter). Likewise, if the content exceeds 40 parts by mass, it will be difficult to obtain the necessary adhesive strength. In other words, it will be difficult to firmly bond the rubber layer to the surface of the gas barrier layer.

Additionally, the content of the EPDM is more preferably from 70 to 50 parts by mass.

If the content of the EPDM is less than 20 parts by mass, it will be difficult to obtain the necessary adhesive strength and rubber sticking. Likewise, if the content exceeds 80 parts by mass, the vulcanization rate will slow, and productivity of the hose will decline.

Next, a description of the alkylphenol-formaldehyde resin will be given.

The alkylphenol-formaldehyde resin acts as a crosslinking agent of the raw rubber and crosslinks the raw rubber.

Halogenated alkylphenol-formaldehyde resins (halogenated alkylphenol-formaldehyde resins) are also included in the alkylphenol-formaldehyde resin. Among these, from the perspective of obtaining superior adhesion between the gas barrier layer and the rubber layer, a halogenated alkylphenol-formaldehyde resin is preferable, and a brominated alkylphenol-formaldehyde resin is more preferable.

Examples of the alkylphenol-formaldehyde resin that can be used include Tackirol 250-I, manufactured by Taoka Chemical Co., Ltd., and the like.

From the perspective of obtaining superior adhesion between the gas barrier layer and the rubber layer, a compounded amount of the alkylphenol-formaldehyde resin is from 1 to 15 parts by mass, preferably from 2 to 10 parts by mass, and more preferably from 2 to 7 parts by mass per 100 parts by mass of the raw rubber. If the compounded amount is less than 1 part by mass, it may be difficult to obtain the necessary adhesive strength. In other words, it may be difficult to firmly bond the rubber layer to the surface of the gas barrier layer. Likewise, if the compounded amount exceeds 15 parts by mass, physical properties (hardness) of the rubber layer may be hindered.

From the perspectives of obtaining superior adhesion between the gas barrier layer and the rubber layer and superior reinforcement action of the rubber layer, the rubber composition preferably further includes a carbon black.

From the perspectives of obtaining superior adhesion between the gas barrier layer and the rubber layer and superior reinforcement action of the rubber layer, colloidal characteristics of the carbon black used in the present technology are preferably such that an $N_2SA$ is greater than or equal to 75 $m^2/g$, and a DBP oil absorption is greater than or equal to 90 $cm^3/100$ g. If the $N_2SA$ is less than 75 $m^2/g$ or the DBP oil absorption is less than 90 $cm^3/100$ g it will be difficult to firmly bond the rubber layer to the surface of the gas barrier layer.

The $N_2SA$ is preferably from 80 to 150 $m^2/g$ and more preferably from 80 to 120 $m^2/g$.

The DBP oil absorption is preferably from 95 to 140 $cm^3/100$ g, and more preferably from 100 to 130 $cm^3/100$ g.

Here, "$N_2SA$" refers to the nitrogen molecular weight adsorbed on the surface of the carbon black, and specifically refers to a value found by measuring according to the stipulations of JIS K 6217-2.

"DBP" refers to the amount of oil adsorbed in the aggregate of the carbon black, and specifically refers to a value found by measuring according to the stipulations of JIS K 6217-4.

Examples of the carbon black having an $N_2SA$ that is greater than or equal to 75 $m^2/g$ and a DBP oil absorption greater than or equal to 90 $cm^3/100$ g include carbon blacks of a grade that is not lower than ISAF or HAF.

From the perspective of obtaining superior adhesion between the gas barrier layer and the rubber layer, a compounded amount of the carbon black is preferably from 30 to 80 parts by mass, and more preferably from 40 to 65 parts by mass per 100 parts by mass of the raw rubber. If the compounded amount is less than 30 parts by mass, it will be difficult to obtain the necessary adhesive strength. In other words, it will be difficult to firmly bond the rubber layer to the surface of the gas barrier layer. If the compounded amount exceeds 80 parts by mass, viscosity of the unvulcanized rubber will increase, which will lead to processability being hindered.

The rubber composition (rubber layer) may include crosslinking agents other than alkylphenol-formaldehyde resin, zinc oxide (ZnO), vulcanization aids, vulcanization accelerators, and additives in addition to the raw rubber, the alkylphenol-formaldehyde resin, and the carbon black.

Examples of the vulcanization aids include fatty acids such as acetic acid, propionic acid, butanoic acid, stearic acid, acrylic acid, maleic acid, and the like; and zincs of fatty acids such as zinc acetate, zinc propionate, zinc butanoate, zinc stearate, zinc acrylate, zinc malate, and the like.

Examples of the vulcanization accelerator include thiuram-based vulcanization accelerators such as tetramethylthiuram disulfide (TMTD), tetraethylthiuram disulfide (TETD), and the like; aldehyde.ammonia-based vulcanization accelerators such as hexamethylene tetramine and the like; guanidine-based vulcanization accelerators such as diphenylguanidine and the like; thiazole-based vulcanization accelerators such as dibenzothiazol disulfide (DM) and the like; and sulfenamide-based vulcanization accelerators such as cyclohexyl benzothiazl sulfenamide and the like.

Examples of the additives include fillers such as clay, reinforcing agents other than carbon black, softeners such as paraffin oils and the like, plasticizers, process aids, antiaging agents, pigments, tackifiers, lubricants, dispersing agents, and the like.

A method for manufacturing the rubber composition is not particularly limited. Examples thereof include methods in which the carbon black, and, as necessary, the additives described above are added to the BIMS and butyl rubber and/or halogenated butyl rubber and the EPDM, and blended using a roll mixer, Banbury mixer, or the like and, thereafter, the alkylphenol-formaldehyde resin and, as necessary, the other zinc oxides, vulcanization aids, and vulcanization accelerators are added and blended.

The rubber layer can be formed by extrusion molding the rubber composition into, for example, a tube shape.

A thickness of the rubber layer is not particularly limited, but is preferably from 0.5 to 3.0 mm.

The hose of the present technology includes an inner tube layer having a gas barrier layer and a rubber layer adjacent to an outer surface of the gas barrier layer. The gas barrier layer and the rubber layer are adjacent to each other and can be directly bonded to each other. Therefore, there is no need to interpose an adhesive layer between the gas barrier layer and the rubber layer.

If the inner tube layer is not formed from the gas barrier layer and the rubber layer that include the specific components at the specific amounts described above, the gas barrier layer and the rubber layer cannot be firmly vulcanization (crosslink) bonded without using an adhesive. In other words, high adhesion (high adhesive strength and high rubber sticking) cannot be obtained.

An inner diameter, an outer diameter, and a length of the hose of the present technology are not particularly limited.

However, for example, the inner diameter of the hose is preferably from 5 to 20 mm and the more preferably from 7 to 17 mm.

So long as the hose of the present technology includes the inner tube layer, it may also further include a reinforcing layer and/or an outer tube layer.

An example of a preferable form of the hose of the present technology is one in which a reinforcing layer is provided on the inner tube layer, and an outer tube layer is provided on the reinforcing layer.

The reinforcing layer is not particularly limited and may be a layer formed having a blade shape or a layer formed having a helical shape. Examples of materials that can be used for the reinforcing layer include thread, wire, and the like. Examples of reinforcing threads include threads formed from vinylon fibers, rayon fibers, polyester fibers, nylon fibers, aromatic polyamide fibers, and the like. Additionally, examples of reinforcing wires include hard steel wires, specifically brass-plated wires or zinc-plated wires that provide anti-rust and adhesion imparting characteristics.

The outer tube layer is formed on an outer side of the inner tube layer and/or the reinforcing layer, and the texture, structure, thickness, and the like are not particularly limited. Conventionally used rubber compositions, resins, metal wires, and the like can be used for the outer tube layer. The same rubber composition used for the rubber layer of the inner tube layer can be used as the rubber composition. Other than the alkylphenol-formaldehyde resin, the rubber composition may include crosslinking agents, fillers, reinforcing agents, plasticizers, antiaging agents, vulcanization accelerators, softeners, tackifiers, lubricants, dispersing agents, process aids, and the like as desired. Examples of the resin include polyamide resins, polyester resins, polyurethane resins, polyacetal resins, vinyl chloride resins, polypropylene, polyethylene, and the like. Additionally, in order to enhance vibration absorbency via increasing weight and/or enhance strength, the outer tube layer can include metal and/or fiber to the extent that flexibility of the hose can still be ensured and vibration non-transmission is not hindered. For example, the outer tube layer can be configured so as to be solid or sponge-like. Moreover, the outer tube layer can be configured to be tube-like, and used by inserting the hose of the present technology therein; or can be configured so as to be helical or spring-like, and used by being wrapped around the hose of the present technology.

The thickness of the outer tube layer is preferably from 1 to 5 mm, more preferably from 0.5 to 3 mm, and even more preferably from 1 to 2 mm.

The outer tube layer may be formed from a plurality of layers.

Next, a description of the structure of the hose of the present technology will be given while referring to the attached drawing.

Figure 1:
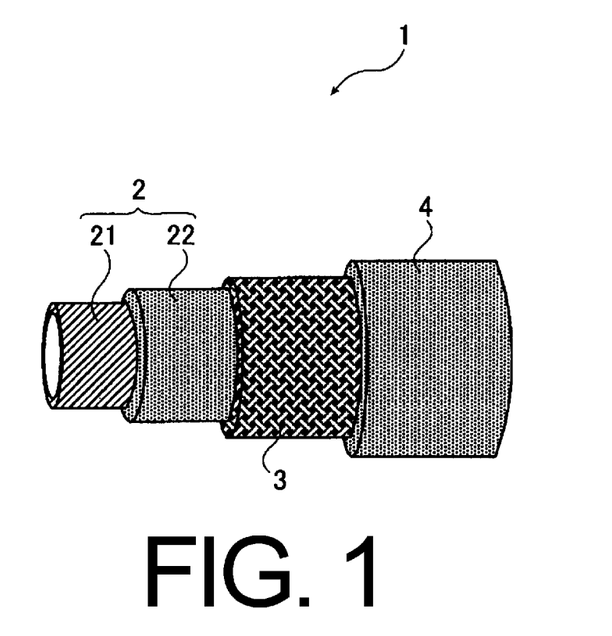
FIG. 1 is a perspective view schematically illustrating a cut-away of each layer for an example of a preferable embodiment of the hose of the present technology.
Figure 2A:
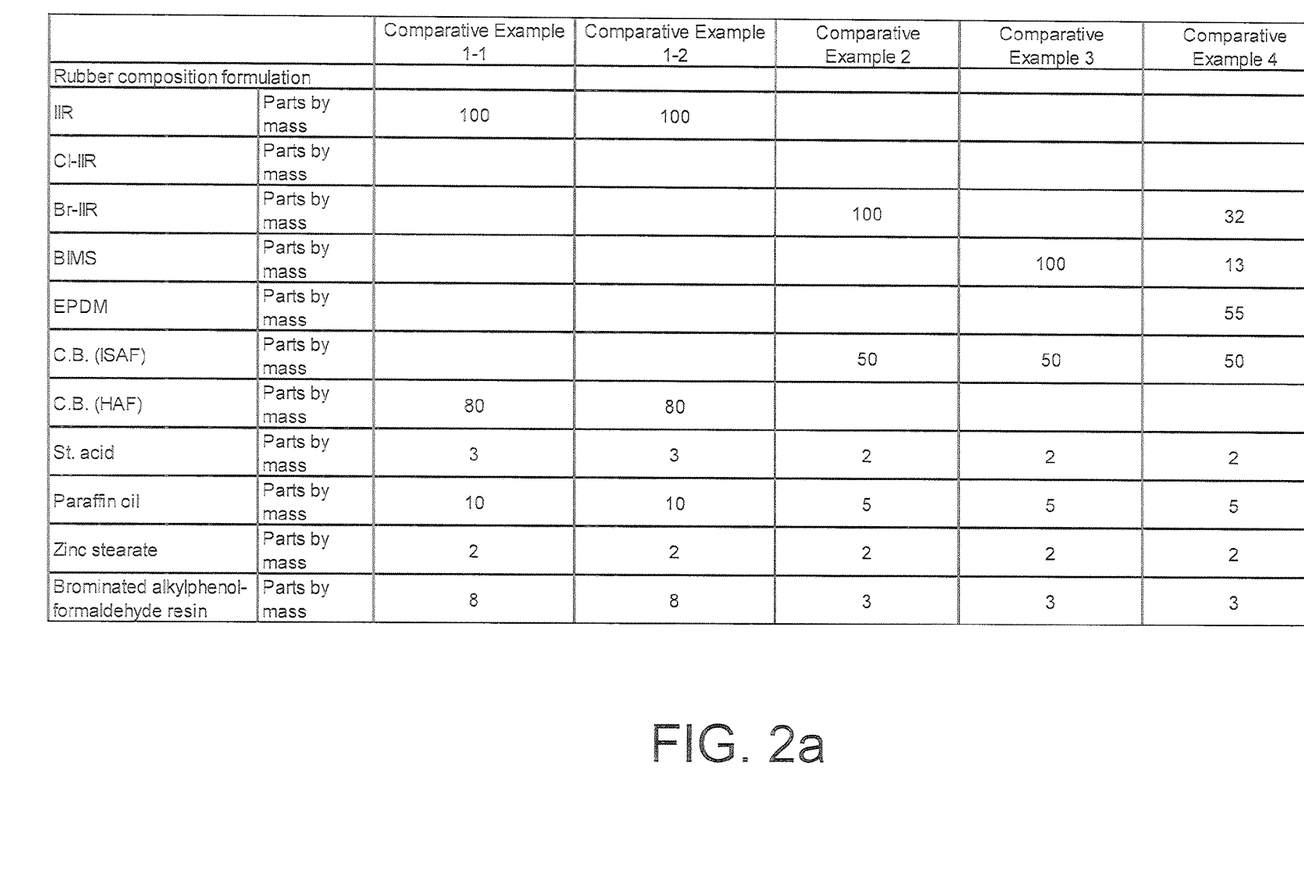
Figure 2B:
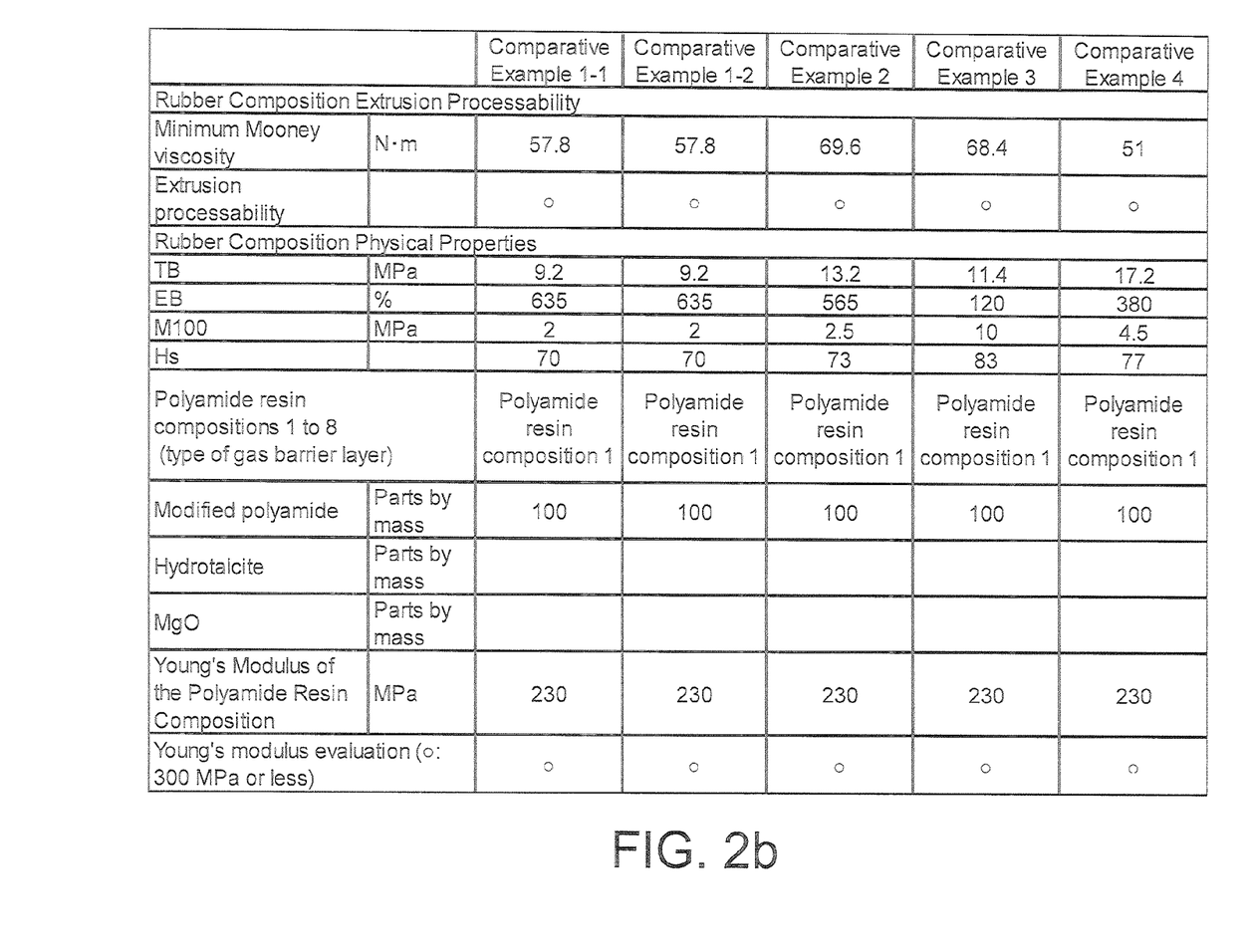
Figure 2C:
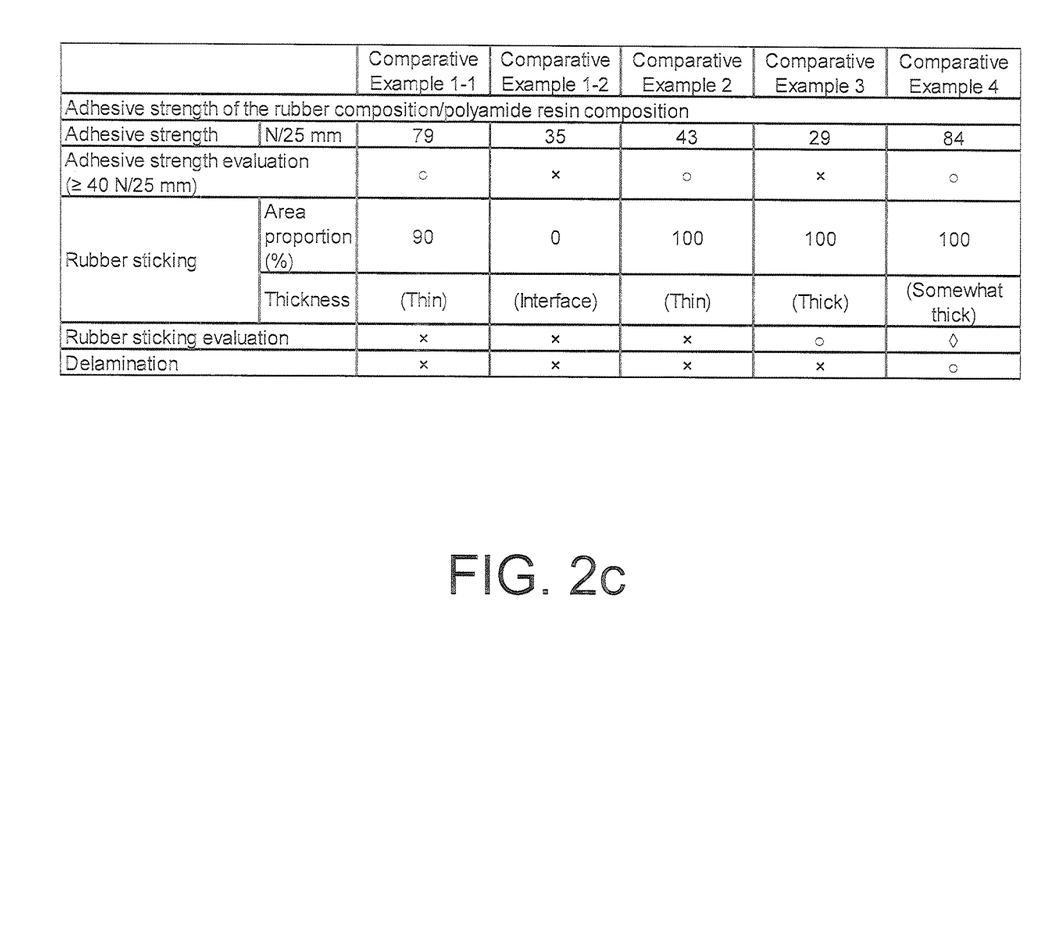
Figure 3A:
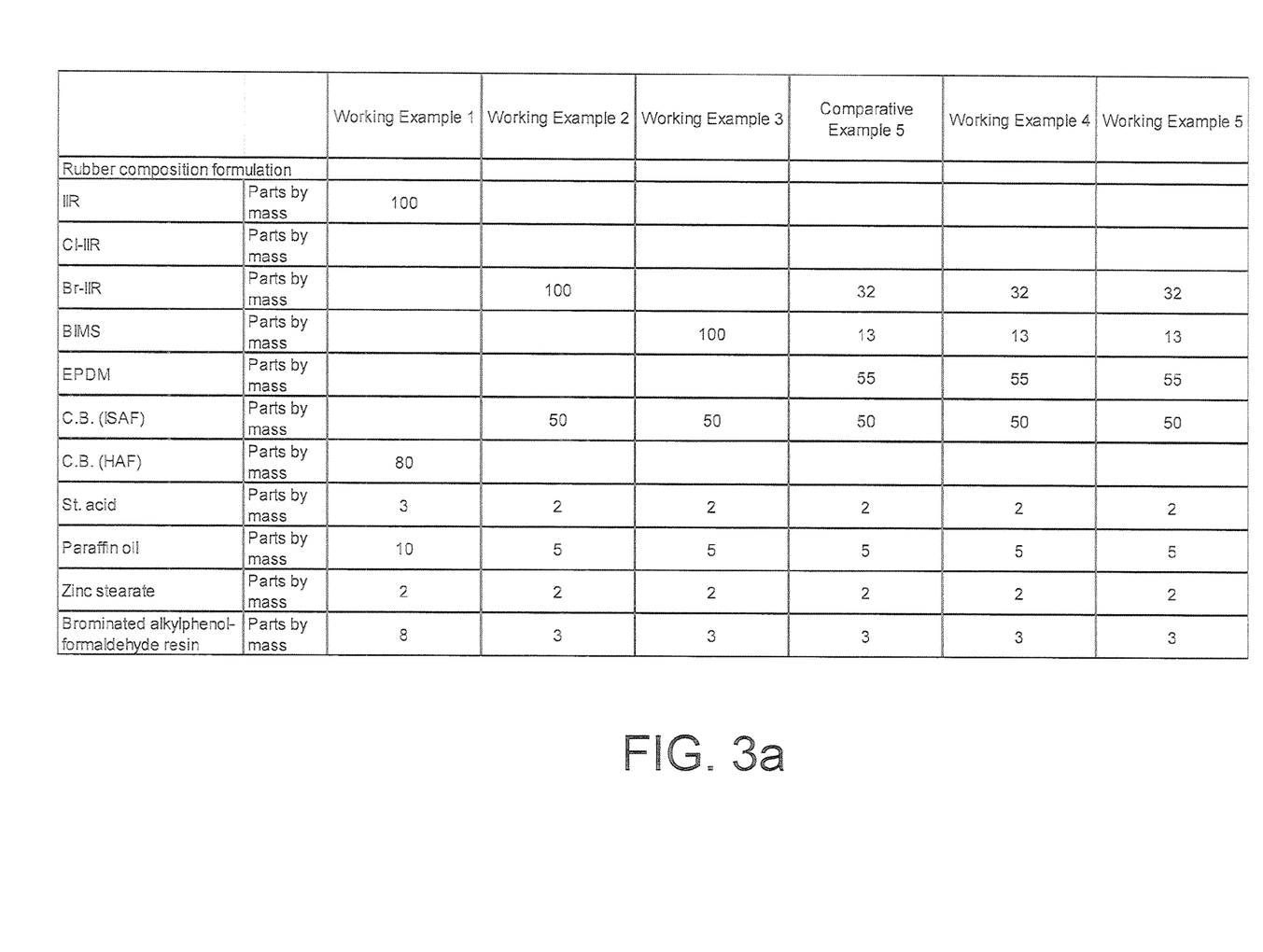
Figure 3B:
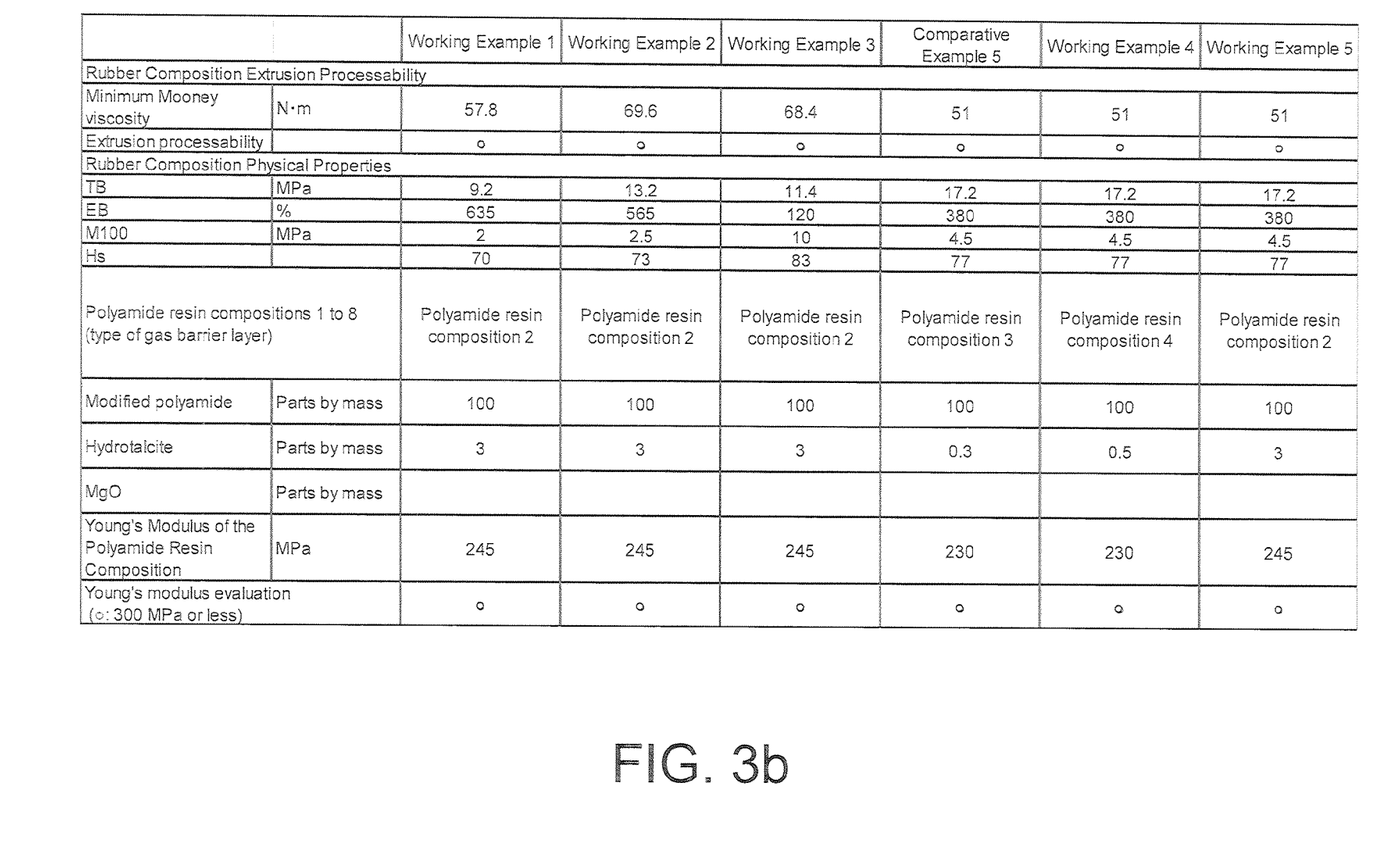
Figure 3C:
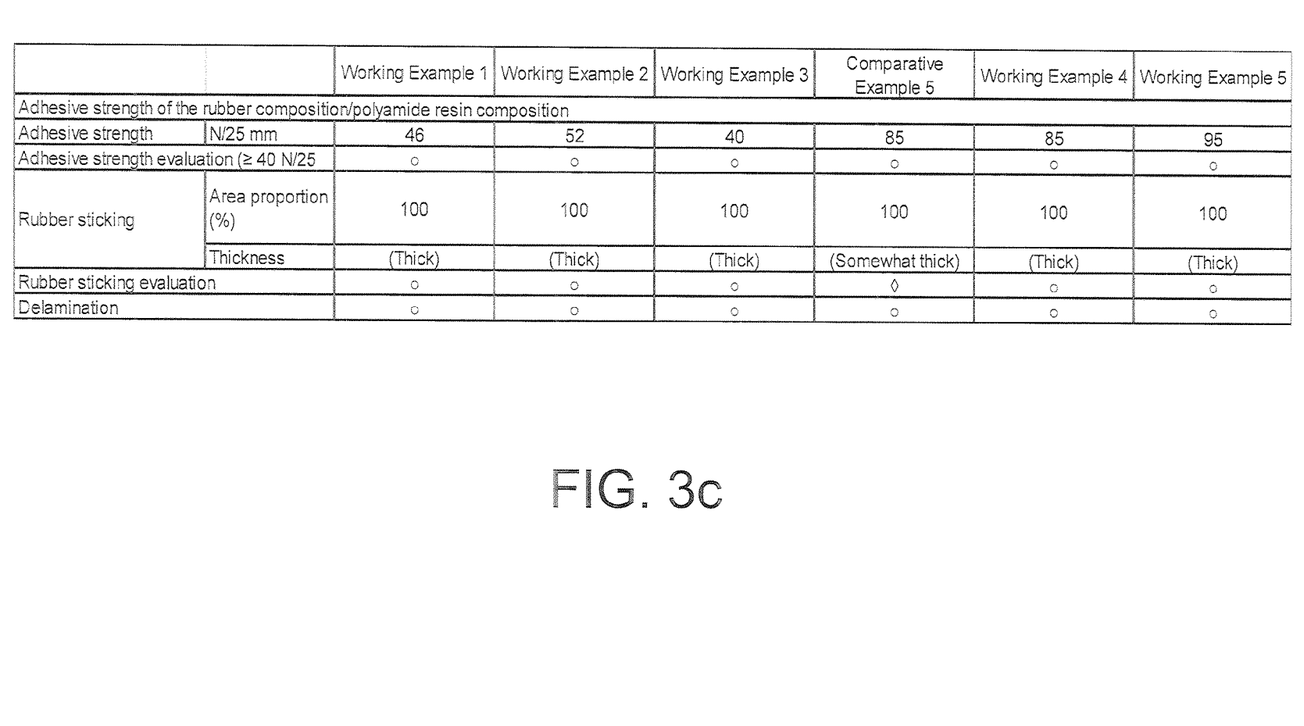
Figure 4A:
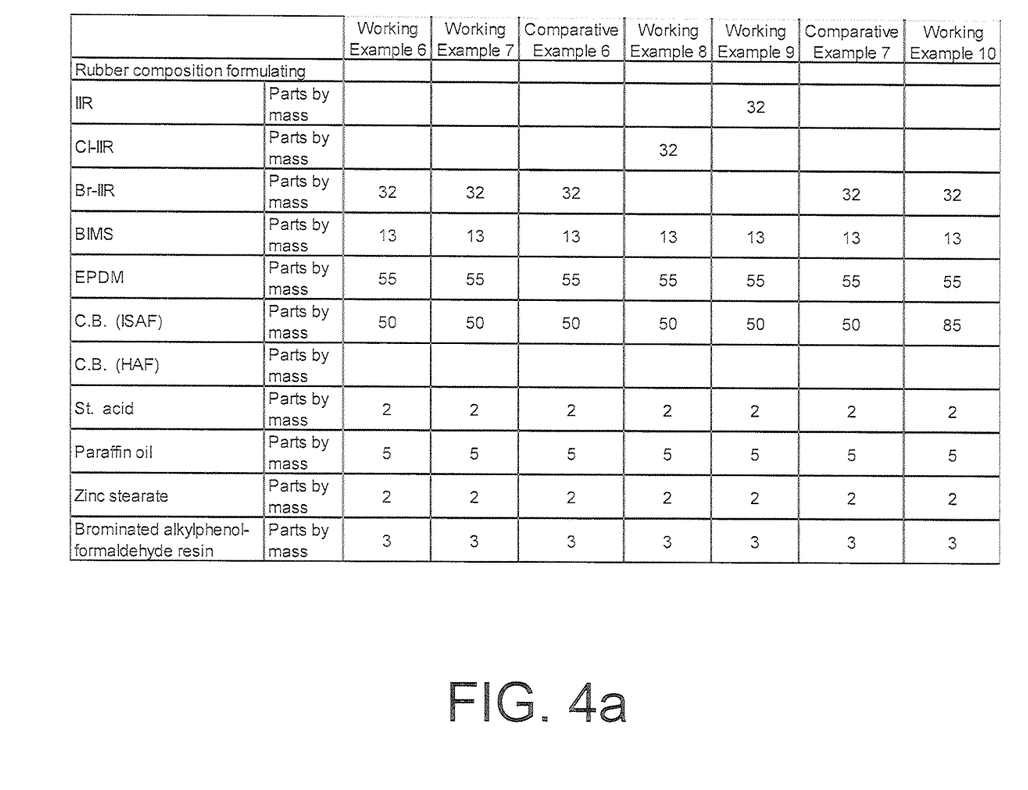
Figure 4B:
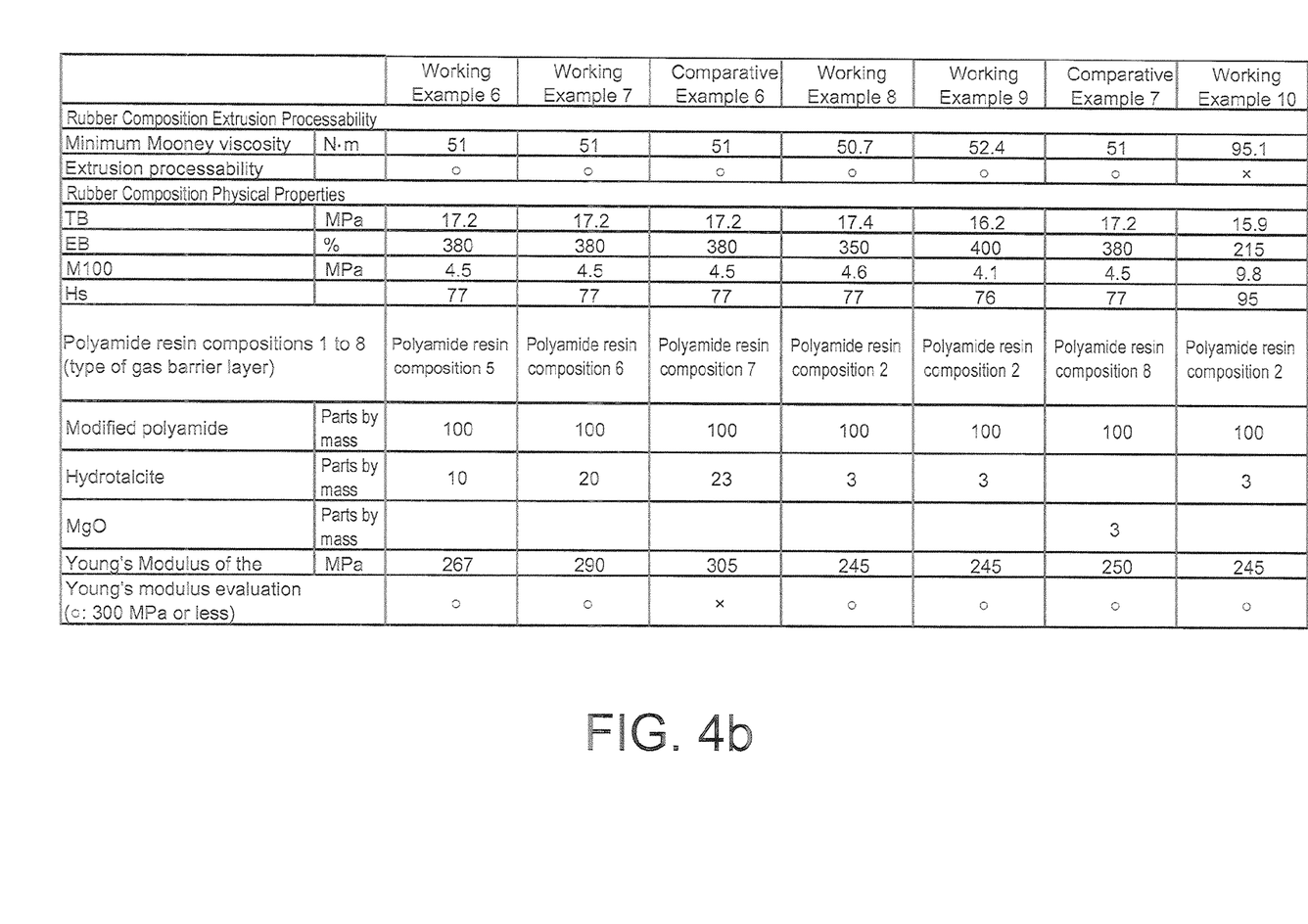
Figure 4C:
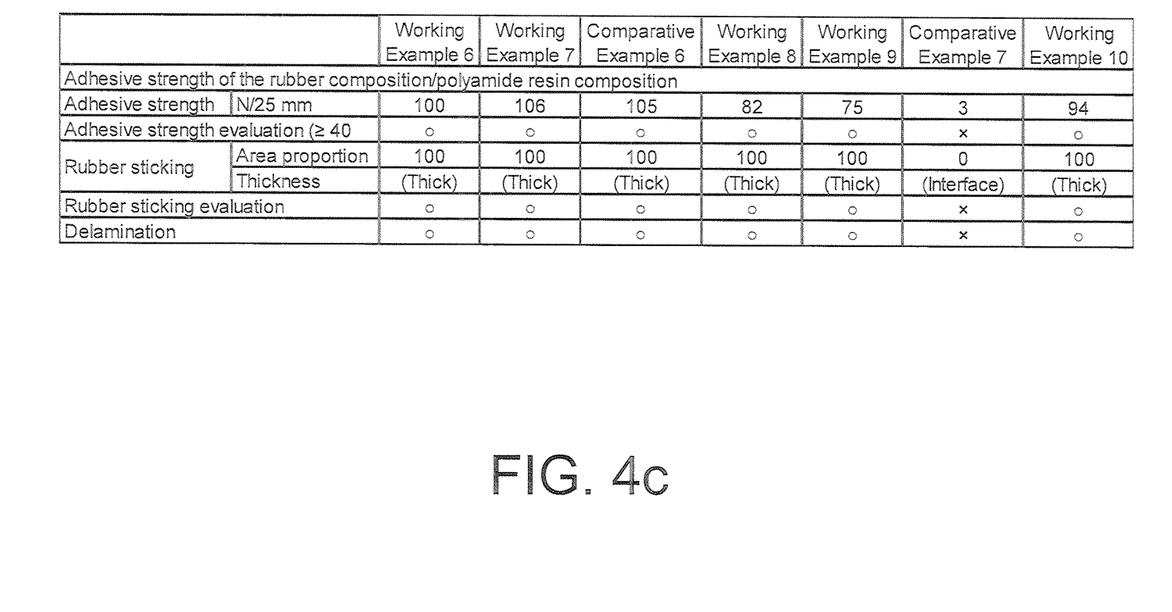

FIG. 1 is a perspective view schematically illustrating a cut-away of each layer for an example of a preferable embodiment of the hose of the present technology.

In FIG. 1, a hose of the present technology 1 includes an inner tube layer 2 having a gas barrier layer 21 and a rubber layer 22 adjacent to an outer surface of the gas barrier layer 21. An adhesive layer is not interposed between the gas barrier layer 21 and the rubber layer 22. However, in the present technology, because the gas barrier layer includes a hydrotalcite, the gas barrier layer 21 and the rubber layer 22 can be firmly bonded together.

In this preferable embodiment, a reinforcing layer 3 is provided on a top surface of the rubber layer 22 and, furthermore, an outer tube layer 4 is provided on a top surface of the reinforcing layer 3.

The hose of the present technology is not particularly limited so long as it includes the inner tube layer 2, and may further include another layer on an outer side of the outer tube layer 4 of the preferable embodiment illustrated in FIG. 1.

While it is not necessary that the hose of the present technology includes the reinforcing layer described above, it is preferable that the reinforcing layer is included because the tensile breaking strength, usable range of pressure, and attachability of fittings of the hose will be enhanced. Particularly, when the hose of the present technology is used to transport high-pressure fluids, the reinforcing layer is preferably included.

A description of a method for manufacturing the hose of the present technology is given below.

The method for manufacturing the hose of the present technology is not particularly limited and a conventionally known method can be used. Examples thereof include methods in which the hose of the present technology is obtained by forming the gas barrier layer and the rubber layer by respective extrusion, or by coextrusion. Here, it is sufficient that the rubber layer be formed using the rubber composition described above. Moreover, it is sufficient that the gas barrier layer be formed using the polyamide resin composition described above. For example, in the case of the hose of the preferable embodiment illustrated in FIG. 1 described above, the hose of the present technology is obtained by laminating the rubber layer on the outer surface of the gas barrier layer, then laminating the reinforcing layer thereon by braiding or helical winding, and finally laminating the outer tube layer (outer side rubber layer); and, thereafter, vulcanizing the entire laminated body.

The vulcanization (crosslinking) can be performed at a temperature from about 150° C. to 180° C.

An example of another method for manufacturing includes a method in which the hose is manufactured by sequentially laminating the gas barrier layer, the rubber layer, the reinforcing layer, and the outer tube layer on a mandrel and, thereafter, vulcanization bonding the laminate on the mandrel for from 30 to 180 minutes at a temperature of from 140° C. to 190° C. by press vulcanization, steam vulcanization, oven vulcanization (dry heat vulcanization), or hot water vulcanization.

Because the hose of the present technology has superior adhesion between the gas barrier layer and the rubber layer, retention of gases and liquids at the bonding interface between the gas barrier layer and the rubber layer, which leads to bulging of the gas barrier at that portion, will not occur. Additionally, with the hose of the present technology, because it is not necessary to use an adhesive or the like to bond the gas barrier layer and the rubber layer, the adverse impact on the environment due to solvents included in the adhesive will be eliminated, and costs can be reduced as a result of reducing the manufacturing processes of the hose.

The refrigerant-containing composition that can be used in the hose of the present technology is not particularly limited. Examples thereof include compositions including a refrigerant and a lubricant such as fluorine-based compounds.

Examples of the refrigerant-containing composition include fluorine-based compounds with double bonds such as 2,3,3,3-tetrafluoropropene (structural formula: $CF_3$—$CF$=$CH_2$, HFO-1234yf); and saturated hydrofluorocarbons such as HFC-134a (structural formula: $CF_3$—$CFH_2$).

The lubricating oil included in the refrigerant-containing composition is not particularly limited. Examples thereof include conventionally known products.

The hose of the present technology can be used to transport a refrigerant, and, for example, can be used as a hose for transporting fluids such as a hose for use in air conditioning systems (e.g. car air conditioning systems). Additionally, the hose of the present technology can be used, for example, as a hose for transporting hot water (temperature regulator use) in addition to being usable as a hose for use in air conditioning systems.

EXAMPLES

A description of the hose of the present technology is given below using working examples, but the present technology is not limited to these working examples.

Production of the Rubber Composition

Components shown below (with the exception of the brominated alkylphenol-formaldehyde resin and the zinc stearate) were used at the amounts (parts by mass) shown in Table 1 in FIGS. 2a-4c and were kneaded using a roll or Banbury mixer. Thereafter, the brominated alkylphenol-formaldehyde resin and the zinc stearate were added at the amounts (parts by mass) shown in Table 1 and kneaded, and the rubber composition was produced.

Butyl rubber (IIR): EXXON BUTYL 268, manufactured by Japan Butyl Co., Ltd.

Chlorinated butyl rubber (Cl-IIR): EXXON CHLOROBUTYL 1066, manufactured by Japan Butyl Co., Ltd.

Brominated butyl rubber (Br-IIR): EXXON BROMOBUTYL 2255, manufactured by Japan Butyl Co., Ltd.

BIMS: Exxpro 3745, manufactured by EXXONMOBIL CHEMICAL COMPANY

EPDM: Mitsui EPT4070, manufactured by Mitsui Chemicals, Inc.

Carbon black [C.B. (ISAF)]: Shoblack N220, manufactured by Showa Cabot K.K. Carbon black having an $N_2SA$ that is greater than or equal to 75 $m^2$/g and a DBP oil absorption that is greater than or equal to 90 $cm^3$/100 g.

Carbon black [C.B. (HAF)]: Shoblack N330, manufactured by Showa Cabot K.K. Carbon black having an $N_2SA$ that is greater than or equal to 75 $m^2$/g and a DBP oil absorption that is greater than or equal to 90 $cm^3$/100 g.

Stearic acid (St. Acid): Lunac YA, manufactured by Kao Corporation

Paraffin oil: Process Oil 123, manufactured by Showa Shell Seikyu K.K.

Zinc stearate: Zinc stearate, manufactured by Seido Chemical Industry Ltd.

Brominated alkylphenol-formaldehyde resin: Tackirol 250-I, manufactured by Taoka Chemical Co., Ltd.

Production of the Polyamide Resin Composition

Polyamide resin compositions 2 to 8 were produced by uniformly mixing the components shown in Table 1 in FIGS. 2a-4c at the amounts (parts by mass) also shown in Table 1 using a twin screw kneader extruder. Note that for polyamide resin composition 1, 100 parts by mass of a modified polyamide (an alloy of polyamide 6 and a carboxyl group-containing modified polyolefin), Zytel® ST811HS, manufactured by DuPont, was used.

Modified polyamide: Alloy of polyamide 6 and a carboxyl group-containing modified polyolefin, Zytel® ST811HS, manufactured by DuPont Hydrotalcite: KW-2200, manufactured by Kyowa Chemical Industrial Co., Ltd. $Mg_{0.7}Al_{0.3}O_{1.15}$; not surface treated MgO: Magnesium oxide (Kyowa Mag 150), manufactured by Kyowa Chemical Industrial Co., Ltd.

Evaluation

Tests were performed and evaluations conducted for rubber composition extrusion processability, rubber composition physical properties, Young's modulus of the polyamide resin composition, adhesive strength of the rubber composition/polyamide resin composition, and delamination according to the methods described below. The results are shown in Table 1 in FIGS. 2a-4c.

Rubber Composition Extrusion Processability

A minimum Mooney viscosity of each of the rubber compositions obtained as described above was measured. "Minimal Mooney viscosity" refers to a value (Vm) measured at 125° C. in a Mooney scorch test according to JIS K 6300-1.

Additionally, a head having a rounded-rod shape was attached to a small screw extruder (compression-type screw used) and extrudability where a temperature of the head and the cylinder was 80° C. and the rotation speed was 60 rpm was confirmed. Those products that had a form (visual appearance, etc.) of a level usable as a hose were evaluated as "o" and those that were not of a usable level were evaluated as "x".

Rubber Composition Physical Properties

Using a 150° C. press molding machine, each of the rubber compositions obtained as described above was vulcanized for 45 minutes under a surface pressure of 3.0 MPa. Thus, a vulcanized sheet having a thickness of 2 mm was fabricated. JIS No. 3 dumbbell-shaped test pieces were cut-out of these sheets and tensile tests were conducted in accordance with JIS K6251 at a pulling speed of 500 mm/minute. Tensile strength ($T_B$) [MPa], elongation at breaking ($E_B$) [%], and 100% modulus ($M_{100}$) [MPa] were measured at room temperature.

Additionally, hardness ($H_S$) at room temperature of each of cured products of each of the rubber compositions was measured using a type A durometer in accordance with JIS K6253.

Young's Modulus of the Polyamide Resin Composition

A sheet was fabricated from a polyamide resin composition obtained via the process described above using an electric heating press at a temperature of 230° C. A sample was cut from the sheet having the following dimensions: 5 mm (width)×80 mm (length)×0.15 mm (thickness) and this was used as the sample.

The Young's modulus of the obtained sample was measured in accordance with JIS K 7161 at a pulling speed of 50 mm/minute.

Manufacturing of the Hose

Hoses were manufactured using the rubber compositions and the polyamide resin compositions of each of the Working Examples and the Comparative Examples.

Specifically, first, the polyamide resin composition obtained as described above was molded by being drawn out on a mandrel (outer diameter: 11 mm) using an extruder so as to form a gas barrier layer having a thickness of 0.1 mm.

Next, using the rubber composition obtained as described above, a rubber layer having a thickness of 1.4 mm was formed on the outer surface of the obtained gas barrier layer. After laminating the rubber layer on the outer surface of the gas barrier layer, the entire body was vulcanized and a hose having only the inner tube layer was obtained. The vulcanization was performed at about 150° C. to 180° C. under vapor pressure. Thus, a hose having a wall thickness of 1.5 mm and an outer diameter of 14 mm was obtained.

Note that in Comparative Example 1-1, the gas barrier layer and the rubber layer were bonded using an adhesive (Chemlok 402X, manufactured by Lord Corporation).

Adhesion of the Rubber Composition/Polyamide Resin Composition

Adhesive strength and rubber sticking when peeling the rubber layer at a peeling speed of 50 mm/minute were measured for each of the hoses obtained as described above.

Here, "adhesive strength" refers to adhesive strength (N) per 25 mm (width). Hoses that displayed an adhesive strength of 40N/25 mm or greater were evaluated as "o", and hoses that displayed an adhesive strength of less than 40N/25 mm were evaluated as "x".

Area and thickness of the rubber sticking was evaluated.

"Rubber sticking (area)" refers to a proportion of the area (%) to which rubber (peeled from the rubber layer) stuck to the gas barrier layer, after the rubber layer had been peeled following the adhesion strength evaluation.

"Rubber sticking (thickness)" refers to a visual evaluation of the thickness of the rubber stuck to the gas barrier layer after the rubber layer had been peeled off. The thickness was evaluated as "thick", "somewhat thick", "thin", and "interface" (meaning that the peeling occurred at the interface between the gas barrier layer and the rubber layer).

In the evaluation of the rubber sticking, cases where rubber sticking was "thick" were evaluated as "o (excellent)", cases where rubber sticking was "somewhat thick" were evaluated as " ◊ ", and cases where rubber sticking was "thin" or that peeled at the "interface" were evaluated as "x".

Delamination

A hose having an inner diameter of 11 mm, an outer diameter of 14 mm (wall thickness of the hose was 1.5 mm), and a length of 50 cm was manufactured according to the method described above.

Then, a refrigerant (HFC-134a) was injected into the hose and, thereafter, both ends of the hose were capped and sealed. Then, the sealed hose was left to sit in an oven for 24 hours at 90° C. In this case, the refrigerant was encapsulated so as to be 0.6 g/cm$^3$.

Thereafter, following the release of the refrigerant, the hose was immediately put in a 120° C. oven and left to sit for 24 hours.

Then, the hose was cut in half (lengthwise) and a state of peeling of the resin (gas barrier layer) was confirmed. Hoses in which the resin did not peel were evaluated as "o", and hoses in which the resin did peel were evaluated as "x".

As is clear from the results shown in Table 1 in FIGS. 2a-4c, in Comparative Example 1-1, where the gas barrier layer and the rubber layer were bonded using an adhesive, rubber sticking was thin, the resin peeled in the delamination test, and the adhesion between the gas barrier layer and the rubber layer was insufficient.

In Comparative Example 1-2 and Comparative Example 3, where the polyamide resin composition did not include a hydrotalcite, adhesive strength between the gas barrier layer and the rubber layer (adhesive strength between the polyamide resin composition and the rubber composition; same hereinafter) was low and adhesion was inferior.

In Comparative Example 2 and Comparative Example 4, where the polyamide resin composition did not include a hydrotalcite, with respect to rubber sticking, thickness of the rubber was insufficient and adhesion was inferior.

In Comparative Example 5, where the content of the hydrotalcite was less than 0.5 parts by mass per 100 parts by mass of the modified polyamide, with respect to rubber sticking, thickness of the rubber was insufficient and adhesion was inferior.

In Comparative Example 6, where the content of the hydrotalcite exceed 20 parts by mass per 100 parts by mass of the modified polyamide, while adhesion was superior, the Young's modulus of the polyamide resin composition exceeded 300 MPa.

In Comparative Example 7, where the polyamide resin composition included magnesium oxide in place of the hydrotalcite, adhesive strength between the gas barrier layer and the rubber layer was low, rubber sticking was insufficient, and adhesion between the gas barrier layer and the rubber layer was inferior. The present inventors speculate that a cause of this was due to the magnesium oxide reacting with the carboxyl groups contained in the carboxyl group-modified polyolefin included in the modified polyamide and forming ionomers, which lead to the carboxyl group-modified polyolefin not reacting with the rubber composition.

Note that Comparative Example 2 corresponds to the embodiment described in Japanese Unexamined Patent Application Publication No. 2000-220770A and Comparative Example 4 corresponds to the embodiment described in Japanese Patent No. 4365454.

In contrast, in Working Examples 1 to 10, adhesive strength between the gas barrier layer and the rubber layer is high, and rubber sticking is excellent and adhesion between the gas barrier layer and the rubber layer is superior.

Particularly, in Working Examples 4 to 7 and 10, where the raw rubber includes the BIMS, Br-IIR as the halogenated butyl rubber, and the EPDM, adhesive strength is high and adhesion is superior.

Additionally, it is clear from the results of Working Examples 4 to 6 that adhesive strength between the gas barrier layer and the rubber layer increases as the amount of the hydrotalcite increases. In the results of Working Example 7 as well, the adhesive strength between the gas barrier layer and the rubber layer is sufficiently high, and even though the among of the hydrotalcite exceeds 10 parts by mass per 100 parts by mass of the modified polyamide, the adhesion between the gas barrier layer and the rubber layer does not severely decline.

Additionally, the resin does not peel in the delamination tests for Working Examples 1 to 10.

Compared to Working Example 10, Working Examples 1 to 9 further include carbon black in the rubber composition at a compounded amount of from 30 to 80 parts by mass per 100 parts by mass of the raw rubber. This results in a low minimum Mooney viscosity and superior extrusion processability.

Working Example 11

Manufacture of Hose 1 Including a Reinforcing Layer and an Outer Tube Layer

A hose was manufactured by extruding a gas barrier layer having a thickness of 0.15 mm using the polyamide resin composition 4 of Working Example 4 with a resin extruder on a surface of a mandrel made from thermoplastic resin having an outer diameter of 11 mm (extrusion temperature: 240° C.). A rubber layer (rubber composition of Working Example 4) having a thickness of 1.2 mm was extruded on a surface of the gas barrier layer to form the inner tube layer. A two-layer reinforcing layer made by alternately winding polyethylene terephthalate (PET) fiber having a gross thread thickness of 80,000 dtex in a helical manner was formed. A cover rubber layer (the same butyl rubber composition A described below was used) having a thickness of 1.0 mm was extruded on the reinforcing layer and formed into an extruded outer tube layer. Furthermore, a conventional polymethylpentene resin was extruded on the extruded outer tube layer and formed into a cover skin. The obtained tube shaped laminate was vulcanized for 100 minutes at 160° C. and, thereafter, the cover skin and the mandrel were removed from the tube shaped laminate. The obtained hose is referred to as hose 1. The hose 1 has superior adhesion between the gas barrier layer and the rubber layer.

Butyl rubber composition A (cover rubber layer): Composition including 100 parts by mass of butyl rubber, 80 parts by mass of carbon black (HAF), 3 parts by mass of stearic acid, 10 parts by mass of paraffin oil, 2 parts by mass of zinc oxide, and 8 parts by mass of brominated alkyl phenol formaldehyde resin.

Working Example 12

Manufacture of Hose 2

Other than replacing the polyamide resin composition and the rubber composition used in Working Example 4 with the polyamide resin composition and the rubber composition used in Working Example 5, a hose 2 was manufactured the same as the hose 1 of Working Example 11. The hose 2 has superior adhesion between the gas barrier layer and the rubber layer.

Working Example 13

Manufacture of Hose 3

Other than replacing the polyamide resin composition and the rubber composition used in Working Example 4 with the polyamide resin composition and the rubber composition used in Working Example 6, a hose 3 was manufactured the same as the hose 1 of Working Example 11. The hose 3 has superior adhesion between the gas barrier layer and the rubber layer.

Working Example 14

Manufacture of Hose 4

Other than replacing the polyamide resin composition and the rubber composition used in Working Example 4 with the polyamide resin composition and the rubber composition used in Working Example 7, a hose 4 was manufactured the same as the hose 1 of Working Example 11. The hose 4 has superior adhesion between the gas barrier layer and the rubber layer.

What is claimed is:

1. A hose for transporting refrigerant comprising an inner tube layer including a gas barrier layer and a rubber layer adjacent to an outer surface of the gas barrier layer, wherein
    the gas barrier layer comprises a polyamide resin composition comprising from 0.5 to 20 parts by mass of a hydrotalcite that is not surface treated per 100 parts by mass of a modified polyamide obtained by blending a polyamide and a carboxyl group-containing modified polyolefin;
    the rubber layer comprises a rubber composition comprising from 1 to 15 parts by mass of an alkylphenol-formaldehyde resin per 100 parts by mass of a raw rubber and from 30 to 80 parts by mass of a carbon black per 100 parts by mass of the raw rubber;
    the raw rubber comprises a BIMS, a butyl rubber and/or a halogenated butyl rubber, which is a copolymer rubber and, also, an EPDM (ethylene propylene diene terpolymer);
    a content of the BIMS in the raw rubber is from 5 to 40 parts by mass, a total content of the BIMS and the copolymer rubber is from 20 to 80 parts by mass, and a content of the EPDM is from 80 to 20 parts by mass; and
    the carbon black has an $N_2SA$ that is greater than or equal to 75 $m_2/g$ and a DBP dibutyl phthalate) absorption number that is greater than or equal to 90 $cm_3/100$ g.

2. The hose for transporting refrigerant according to claim 1, wherein the copolymer rubber is a halogenated butyl rubber.

3. The hose for transporting refrigerant according to claim 1, wherein the polyamide is at least one selected from the group consisting of polyamide 6, polyamide 11, polyamide 12, polyamide 4-6, polyamide 6-6, polyamide 6-10, polyamide 6-12, polyamide MXD-6, and copolymers of two or more of these.

4. The hose for transporting refrigerant according to claim 1, wherein the hydrotalcite is produced by calcining a raw hydrotalcite.

5. The hose for transporting refrigerant according to claim 1, wherein an adhesive layer is not interposed between the gas barrier layer and the rubber layer.

6. The hose for transporting refrigerant according to claim 1, wherein the gas barrier layer and the rubber layer are directly bonded.

7. The hose for transporting refrigerant according to claim 1, wherein a reinforcing layer is provided on the inner tube layer and an outer tube layer is provided on the reinforcing layer.

8. The hose for transporting refrigerant according to claim 1, wherein the hydrotalcite is $Mg_{1-x}Al_xO_{3.83x}$ where $0.2 \leq x \leq 0.5$.

9. The hose for transporting refrigerant according to claim 1, wherein a sheet is fabricated at a temperature of 230° C. using the polyamide resin composition, a sample having a width of 5 mm, a length of 80 mm, and a thickness of 0.15 mm is cut from the sheet and used as a sample, and a Young's modulus of the sample when measured at a tensile speed of 50 mm/minute in accordance with JIS (Japanese Industrial Standard) K 7161 is 300 MPa or less.

10. The hose for transporting refrigerant according to claim 1, wherein a refrigerant-containing composition comprising a refrigerant and a lubricant is used therein, and the refrigerant is a fluorine-based compound containing double bond or a saturated hydrofluorocarbon.

11. The hose for transporting refrigerant according to claim 1, wherein a mass ratio of the polyamide to the carboxyl group-containing modified polyolefin is from 85/15 to 65/35.

12. The hose for transporting refrigerant according to claim 1, wherein an amount of the hydrotalcite is from 3 to 15 parts by mass per 100 parts by mass of the modified polyamide.

13. The hose for transporting refrigerant according to claim 1, wherein a mixing temperature is from 200° C. to 280° C.

14. The hose for transporting refrigerant according to claim 1, wherein a Young's modulus of the polyamide resin composition after hardening is 270 MPa or less.

15. The hose for transporting refrigerant according to claim 1, wherein a thickness of the gas barrier layer is from 0.05 to 0.20 mm and wherein a content of a p-alkylstyrene in the BIMS is from 5 to 10 mass %.

* * * * *